Oct. 24, 1944.　　J. I. ELLERSTEIN　　2,360,942
DRILL GUIDE
Filed Jan. 23, 1943
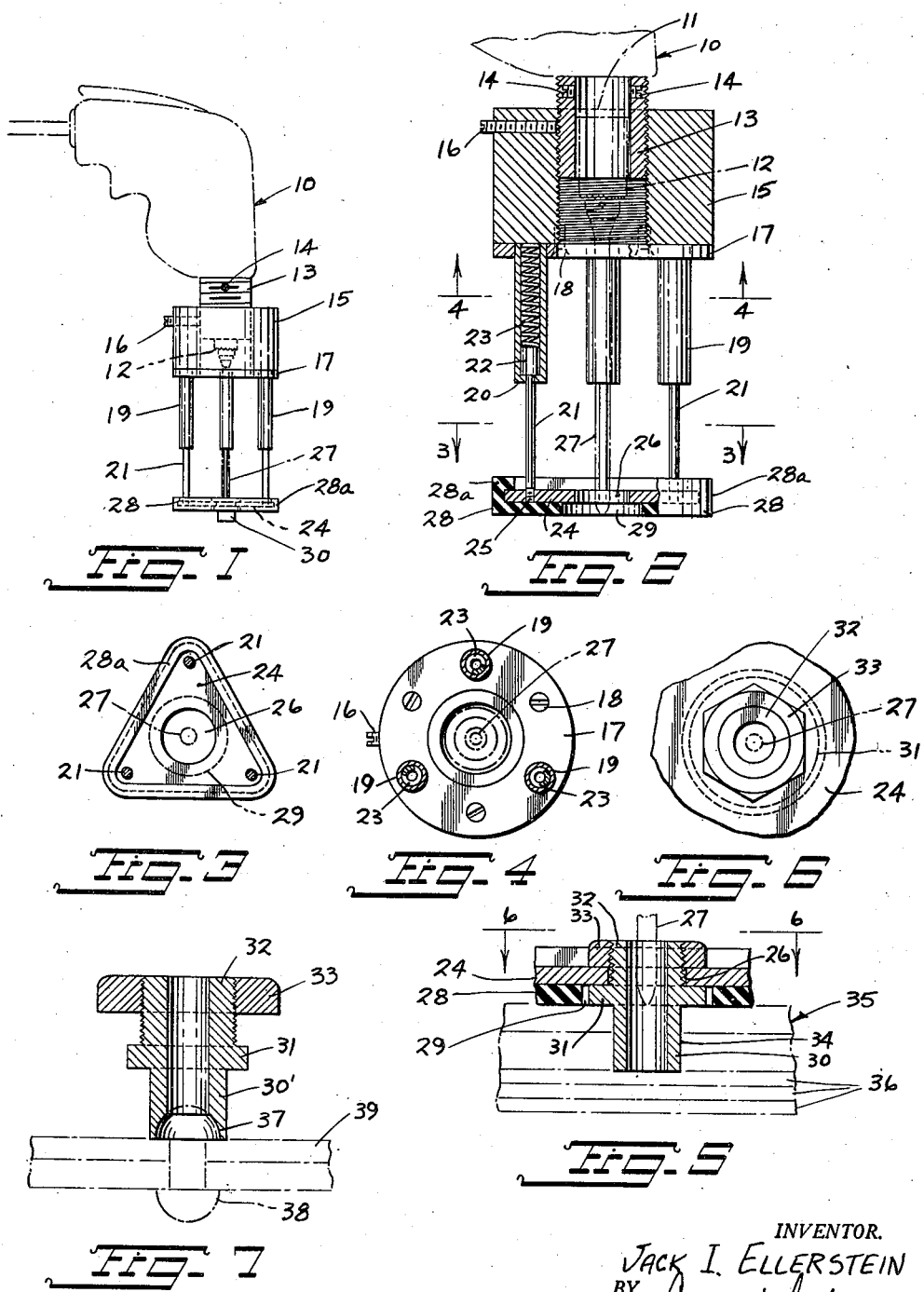
INVENTOR.
JACK I. ELLERSTEIN
BY
ATTORNEY.

Patented Oct. 24, 1944

2,360,942

UNITED STATES PATENT OFFICE 2,360,942

DRILL GUIDE

Jack I. Ellerstein, New York, N. Y.

Application January 23, 1943, Serial No. 473,321

1 Claim. (Cl. 77—55)

This invention relates to new and useful improvements in drilling guides, and has more particular reference to a drilling guide for a hand operated drill.

The invention is particularly intended for drills used in airplane production, though of course the improved drill may also be used for other purposes. In the airplane field there is a large use for hand drills for drilling the aluminum sheets and other parts used in the construction work. In mass production templates are used to locate the holes, and hand drills for drilling the parts. For each hole in the template, a drill guide bushing is mounted on the template. The practice is to first drill the holes through the bushings of the template and then to ream such holes, or redrill them with larger drill sizes, and then rivet the parts together.

The hand drills used are usually of the gun type. This type of drill is unbalanced and it is quite difficult to hold it steady and straight during the drilling operation without a guiding template. For this reason highly experienced workmen are necessary, and/or elaborate templates, as unskilled labor causes considerable waste in incorrectly drilled holes. This invention contemplates a guide for a drill gun which is capable of steadying the gun and guiding the drill so that less care and skill is required for the drilling operation and more accurate results are obtainable, and the need of templates with bushings is eliminated. With the new invention, the templates need only guide openings without bushings.

The new drill guide may also be used for experimental jobs. Heretofore, in experimental work, especially on aluminum sheets, the points to be drilled were marked off with crosses, the drill was then placed against these marks and the chuck was manually turned to form a punch mark so that the drill would hold; then the current was turned "on" for the drilling operation. With the new drilling guide the necessity of turning the chuck for producing a steadying mark is not needed since the drill will be accurately held and it is possible to drill immediately without requiring a starting mark.

The invention contemplates so constructing the drilling guide that the holes may be drilled at right angles to surfaces, or at other angles, yet in all positions the drill will be steadied, so that the drilling operation is simplified.

The invention also proposes the use of auxiliary parts which may be mounted on the drilling guide and which adapt the drilling guide for various specialized operations. For example, one attachment is provided for engaging over the heads of rivets to guide drilling out of defective rivets, which is useful when a rivet is defective or has been misapplied.

This invention is particularly intended to produce a drilling guide which is superior to drilling guides of the type shown in Jagow Patent No. 2,294,303 and Neuwalt Patent No. 1,590,643.

For further comprehension of this invention, and of the objects and advantages thereof, reference will be had to the following description and accompanying drawing and to the appended claim in which the various novel features of the invention are more particularly set forth.

In the accompanying drawing forming a material part of this disclosure:

Fig. 1 is a schematic view of a drill gun with a drilling guide constructed in accordance with this invention.

Fig. 2 is a fragmentary enlarged vertical sectional view of the drill guide shown in Fig. 1, with a part thereof removed.

Fig. 3 is a horizontal sectional view taken on the line 3—3 of Fig. 2.

Fig. 4 is a horizontal sectional view taken on the line 4—4 of Fig. 2.

Fig. 5 is a fragmentary sectional view similar to Fig. 2 but illustrated with the part which was removed in Fig. 2.

Fig. 6 is a sectional view taken on the line 6—6 of Fig. 5.

Fig. 7 is a sectional view of an attachment for the drill guide.

The drilling guide, in accordance with this invention, is intended to be used in conjunction with a drill schematically illustrated in Fig. 1 and indicated by the reference numeral 10. It is required that this drill have a housing 11 from which the driven chuck 12 projects. The drilling guide includes an externally threaded collar 13 for being fixedly mounted on the housing 11 of the drill and around said chuck 12. This collar 13 is releasably held in position by several set screws 14 threadedly engaged through the collar and abutting the housing 11, or other holding means.

An internally threaded collar 15 is threadedly mounted on said externally threaded collar 13. Means is provided for fixedly holding said collars 13 and 15 in various adjusted positions. This means includes a set screw 16 threadedly engaged through the collar 15 and abutting the collar 13. An annular member 17 is mounted on the outer edge of the internally threaded collar 15 by several fastening screws 18.

A plurality of hollow cylinders 19 are mounted on and project from the annular member 17 and are equally spaced from each other. These cylinders 19 extend longitudinally of the axis of the chuck 12. Each cylinder 19 has an inturned flange 20 on its outer end. A finger 21 is slidably mounted on the outer end of each of the cylinders 19 and is provided with an internal head 22 engageable with the flange 20 for limiting the extension of the finger. Springs 23 are mounted within the cylinders 19 and urge the fingers 21 outwards. A plate 24 is mounted across the outer ends of the fingers 21. The outer ends of the fingers 21 are formed with threads 25 which threadedly engage complementary openings in the plate 24 for accomplishing the connection between these parts.

The drilling guide is provided with three of said fingers 21. The plate 24 is of triangular shape, as clearly shown in Fig. 3. The plate 24 is provided with a central opening 26 located coaxially of the chuck 12 and through which the drill bit 27 of the drill 10 may pass. A pad 28 is mounted on the plate 24. Preferably, this pad is in the nature of a sheet rubber member having an edge portion 28a engaging around the edges of the plate 24. The pad 28 is provided with a central opening 29 of a larger diameter than the diameter of the opening 26.

The operation of the device is as follows:

The drilling guide is mounted on the gun 10, as illustrated in Figs. 1 and 2. The gun may be placed against a piece of work to be drilled so that the drill bit 27 is aligned with the point of drilling. The operator may steady the drill gun by holding the collar 15 in one hand while the gun is being held in the other hand. The pad 28 will rest against the work and will frictionally maintain its position so that there is no tendency for the drill 27 to slip off the point which is to be drilled. The pad 28 also protects the work from being scratched. The drill 10 is then forced forwards so that the drill bit 27 drills through the work. During this operation the pins 21 will move into the cylinders 19.

The drill bit 27 may be re-sharpened any number of times, and the drilling guide may be adjusted to the new length of the drill bit. To do this the set screw 16 is loosened and the collar 15 is screwed further upon the collar 13. Similarly, should the drill bit 27 break off during the drilling operation the collar 15 may be set back on the collar 13 to adjust the drill guide to the new length of the drill. Of course, the drill must be pointed in the usual way.

A feature of the invention resides in the fact that with the drill guide, the drill may be held steadier than without it, during a drilling operation. Furthermore, there is no need for manually turning the drill chuck so as to punch the work at the spot to be drilled.

An attachment may be used in conjunction with the drill guide for adapting the drill gun for template drilling. This attachment comprises a bushing 30 through which the drill bit may pass. This bushing 30 has a flange 31 adapted to fit upon the material around the opening 26 of the plate 24. The bushing 30 has an inner threaded end 32 located upwards of the plate 24. A nut 33 is threadedly engaged on this end of the bushing for securely holding the bushing on the plate. The exterior diameter of the bushing 30 is such that it may fit into the holes 34 in a template 35, schematically illustrated in Fig. 5. This template 35 is shown engaged over a stack of sheets 36, (schematically shown) which are to be drilled. It should be noted that the template 35 merely has guiding holes for the bushing 30 without any fixed bushings. Thus, the cost of the template is relatively cheaper.

When desired the bushing 30 may be removed and replaced with bushings of different diameters, or with other drilling attachments.

In Fig. 7 another drilling attachment is disclosed which is very similar to the one shown in detail in Figs. 5 and 6, distinguishing in the fact that the bushing 30' is formed with an end recess 37 in the form of a zone of a sphere adapted to engage the head of a rivet 38 (schematically shown) engaging through the work 39, also schematically shown. This zone 37 is for the purpose of holding the drill centrally relative to the rivet 38 so that the rivet may be drilled out of the work. With this construction it is not necessary to punch the head of the rivet to be removed by a drilling operation.

The drill guide, in accordance with this invention, may be used to drill holes at angles to the plate 24. To do this the drill is supported at the desired angle by resting one edge of the padded plate 24 upon the work being drilled. It will be found that the drill may be moved forwards in the usual way, with one or more of the pins 21 moving into the cylinders 19 during the drilling operation.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new and desire to secure by United States Letters Patent is:

In a drilling guide for a drill having a housing from which a driven chuck projects, a collar connected with said housing and disposed coaxially about said chuck, an annular member coaxially of and in contact with said collar, a plurality of hollow cylinders mounted through and projecting from said annular member, fingers with internal heads mounted in and projecting from said hollow cylinders, springs within said cylinders and acting between said heads and said collar, and means for releasably connecting said annular member with said collar.

JACK I. ELLERSTEIN.